United States Patent [19]

Brennen et al.

[11] Patent Number: 4,811,236

[45] Date of Patent: Mar. 7, 1989

[54] TRANSMISSION LINE VOLTAGE DETECTOR FOR STATIC VAR GENERATOR

[75] Inventors: Michael B. Brennen, Pittsburgh; Alberto Abbondanti, Penn Hills Twp., Allegheny County, both of Pa.

[73] Assignee: Westinghouse Electric Corp., Pittsburgh, Pa.

[21] Appl. No.: 926,303

[22] Filed: Nov. 3, 1986

[51] Int. Cl.[4] .............................................. H02J 3/18
[52] U.S. Cl. .................................... 364/483; 364/480; 323/210
[58] Field of Search ............... 364/480, 483, 484, 576, 364/726, 827, 492; 327/210, 211

[56] References Cited

U.S. PATENT DOCUMENTS

| | | | |
|---|---|---|---|
| 4,057,756 | 11/1977 | Ley et al. | 324/77 B |
| 4,100,604 | 7/1978 | Perreault | 364/724 |
| 4,125,895 | 11/1978 | Buhlmann | 364/483 |
| 4,172,234 | 10/1979 | Gyugyi et al. | 323/210 |
| 4,229,795 | 10/1980 | Vieweg et al. | 364/483 |
| 4,275,452 | 6/1981 | White | 364/726 |
| 4,319,329 | 3/1982 | Girgis et al. | 364/484 |
| 4,455,612 | 6/1984 | Girgis et al. | 364/483 |
| 4,463,432 | 7/1984 | Carter, II | 364/483 |
| 4,527,101 | 7/1985 | Zavis et al. | 318/245 |
| 4,630,228 | 12/1986 | Tarczy-Hornock et al. | 364/576 |

FOREIGN PATENT DOCUMENTS

1350904 4/1974 United Kingdom .
1407401 9/1975 United Kingdom .

OTHER PUBLICATIONS

Elliott, "Fast Transforms: Algorithms, Analyses, Applications", Academic Press, 1982.
Gyugi et al., "Transmission System Static VAR Control", Electric Power Research Institute—Westinghouse Electric Corp., Dec. 1982.
E. A. Udren, "Applied Protective Relaying", Westinghouse Electric Corp. Relay-Instrument Division, Chapter 21.

Primary Examiner—Parshotam S. Lall
Assistant Examiner—V. N. Trans
Attorney, Agent, or Firm—C. M. Lorin

[57] ABSTRACT

In order to maintain low telephone interference (IT factor) during its normal operation and to establish rapid-post-fault voltage support to preserve the integrity of electric power transmission lines in the presence of degraded system impedance and harmonic instability, amplitude detection in a transmission voltage regulator (static VAR generator, SVG) is provided based on real time conventional, or fast, Fourier analysis, data samples being used to establish the fundamental voltage amplitude and collected during a specific, frequency tracking sliding window that precedes the amplitude reading by one line voltage cycle of the transmission line. The number of samples in the window is an integer multiple of the line frequency and, in the case of conventional analysis, the pulse number of the switching power circuit is used in the SVG. The amplitude value is updated after each sampling by shifting (sliding) the one cycle sample data base in a first in - first out manner.

17 Claims, 6 Drawing Sheets

TRANSMISSION LINE VOLTAGE DETECTOR FOR STATIC VAR GENERATOR

BACKGROUND OF THE INVENTION

The control of static VAR compensators and other high power converter equipment requires the accurate measurement of the amplitude of the fundamental component of the line voltage. Two techniques have been used to this effect, but each has inherent drawbacks.

The first approach consists in performing fullwave rectification of each of the 3-phase input voltages, and summing the three rectified signals to produce an output signal, the DC component of which is the desired fundamental amplitude. Precision rectifiers are necessary in order to prevent errors in the output due to diode drops. Nevertheless, the output is not pure DC and it may contain harmonic ripple components primarily at the following frequencies:
 1. At six times the fundamental frequency: This harmonic component is inherently present, unless 12-phase rectification is used which, then, will produce a twelve times ripple.
 2. At twice the fundamental frequency: This component is present when the input voltages are balanced.
 3. At the fundamental frequency: This component is present then one or more o the input voltages contain a DC component.

Moreover, the presence of any harmonic signal in the input voltages will result in some ripple at the output. Ripple has been a problem conventionally corrected by using notch filters essentially at the above three frequencies. However, these introduce further drawbacks:
 1. Underclamped transient responses.
 2. Difficulty to tune, since the fundamental frequency changes, whereupon, complex tracking filters are necessary to cope with the problem.
 3. Reduced bandwidth.
 4. A prohibitive number of notch filters which have become necessary in order to attenuate all cyclic ripple. The remaining residual ripple affects the regulation process by precluding the effective use of signal differentiation in the control loop.

In addition, the use of rectification has proved to be inaccurate when the input signals contain more than a given level of second harmonic. To cope with this, notch filters on the AC side tuned at twice the fundamental frequency have been used, but this has an adverse impact on the system response.

The second approach to an accurate measurement of the amplitude of the fundamental component is the "sum-of-squares" method. Here, each of the three input voltages is squared and the three squared signals are summed. The square-root of the sum will yield a DC signal proportional to the input fundamental amplitude. The primary drawback here is that this method is valid only without the presence of any level of harmonic distortion component on the input. Otherwise it would result in an inaccurate fundamental amplitude determination.

SUMMARY OF THE INVENTION

As a corrective measure to the drawbacks of the prior art methods, amplitude sensing is now proposed by detecting the amplitude while performing Fourier integrations on the input waves. This approach inherently eliminates the errors introduced by the presence of harmonics of the input voltages. The output with such detection is also inherently free from cyclic ripple. Therefore, the need for filtering is reduced, and harmonic effect on the final result no longer presents a problem. The response will be affected by an essentially single delay term, which is one half of one period of the power line voltage, which lends itself to differentiation of the amplitude signal thereby leading to a better voltage regulation.

As an alternative to the Fourier algorithm, the invention proposes an algorithm performed on-line by recurrently and continuously appraising the integration with the "sliding window" technique. The implementation involves high performance microprocessor and a programming approach that emphasizes high speed execution. The sliding window technique has been shown in U.S. Pat. Nos. 4,463,432; 4,229,795 and 4,125,895.

The amplitude detector for transmission line voltage regulation, according to the present invention, allows the regulator to fulfull the contradicting requirements of: (a) low telephone interference (IT factor) generation during steady state operation of the regulator, and (b) quick and accurate voltage support following large system disturbances, even in the presence of large harmonics and a harmonically unstable transmission line impedance.

DESCRIPTION OF THE PREFERRED EMBODIMENT

Voltage fluctuations on high voltage AC transmission lines can be reduced by the installation of static VAR generators along the transmission lines. Voltage regulation is based upon the fact that, in the essentially inductive transmission line, the voltage increases if capacitive current in injected into the line by, for example, the connection of a capacitor across it. Alternately, the voltage can be decreased by connecting an inductor across the line. A static VAR generator is, in fact, a large reactive load connected across the line. It can be varied, usually in a continuous manner, between its full capacitive and full inductive rating. These large static voltage regulators play an important part in preserving the integrity of transmission lines after large system distribances such as line short circuits (faults), load shedding, or generation dropout, by providing the necessary voltage support, in due time, to damp power and phase angle oscillations following a transient. It is, therefore, important that any amplitude change in the transmission line be quickly and accurately measured, so that the regulation steps can take place.

Figure 1:
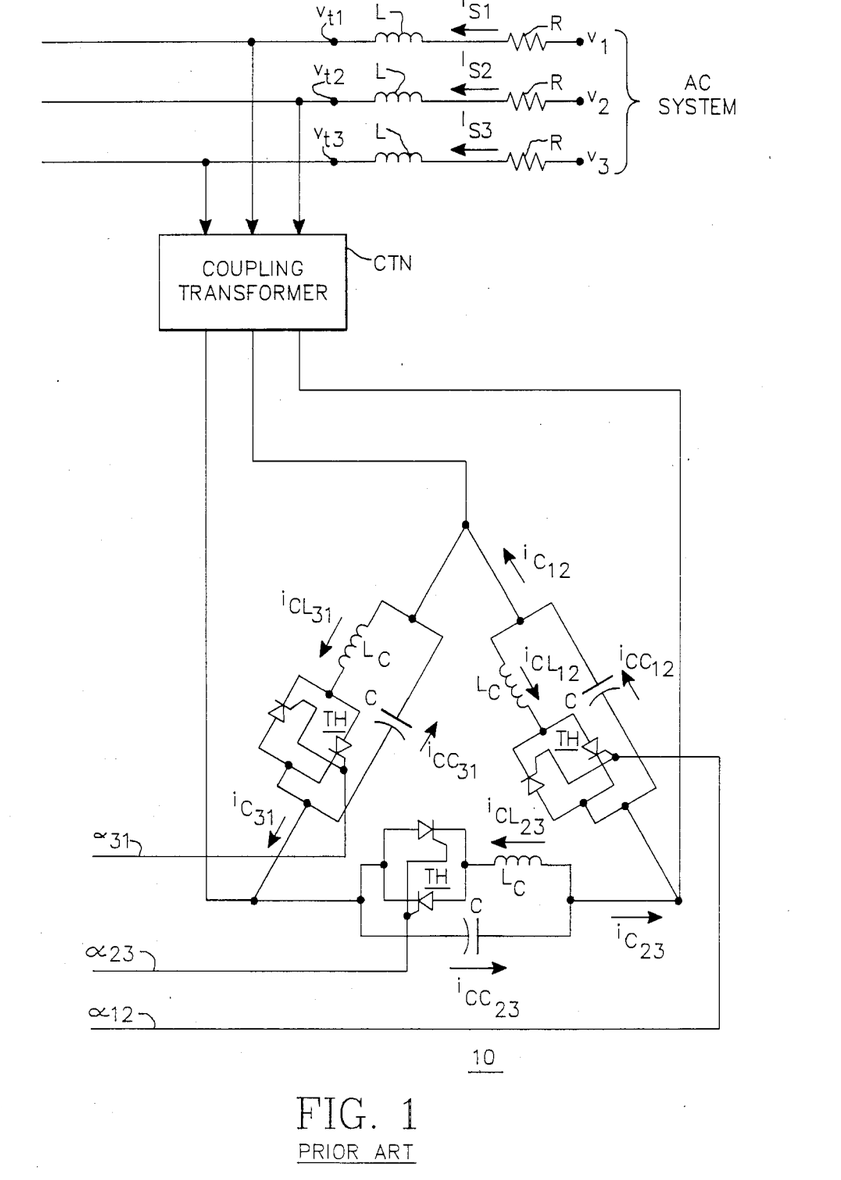
FIG. 1 is a schematic view of a static VAR generator.

FIG. 1 shows a fixed capacitor C and a thyristor-controlled inductor $L_C$. At zero leading VAR demand, the thyristor switch TH is closed and the inductive effect of inductor $L_C$ cancels the capacitive effect of capacitor C, so that the algebraic sum of the capacitor current and the inductor current in each branching ($^iCC_{31}$, $^iCL_{31}$); ($^iCC_{23}$, $^iCL_{23}$) and ($^iCC_{12}$, $^iCL_{12}$) is equal to zero. The voltage across each parallel combination of a capacitor C and an inductance $L_C$ is the line-to-line voltage of the AC system. At some non-zero leading VAR demand, the closing of the switch TH is controlled, in each half-cycle of the alternating current, by a delay firing angle $\alpha$ measured by reference to the peak of the supply voltage, thereby to reduce the current flowing in inductor $L_C$.

Figure 2:
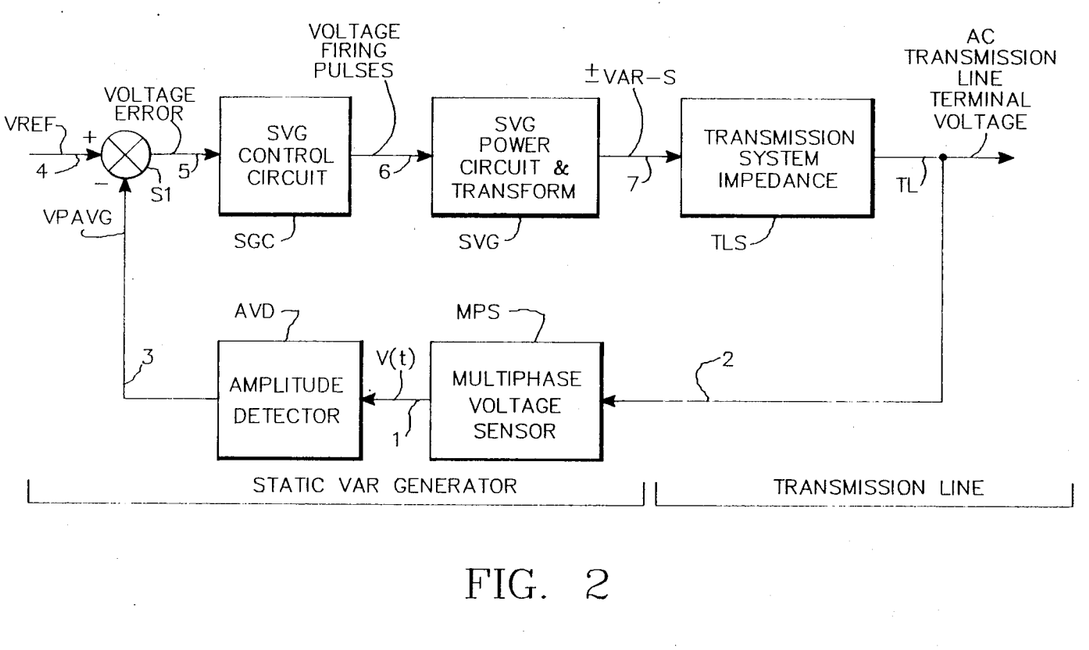
FIG. 2 shows in block diagram the basic circuit of a static VAR generator control circuit.

Voltage control of the electric power transmission lines is illustrated in block diagram by FIG. 2. A comparator S1 compares the reference voltage $V_{REF}$ derived on line 4 with the average voltage derived on line 3. The latter is obtained from the measured terminal voltages derived from transmission lines TL and applied, by lines 2, to a multiphase voltage sensor MPS. The latter may consist of conventional potential transformers. At the output, real time sinusoidal voltages V(t) are derived and applied by line 1 to an amplitude detector. The amplitude detector extracts and amplitude value from the inputted voltages and generates the representative signal applied on line 3 to comparator S1. An error appears as a DC signal on line 5. The signal of line 5 is used to control the firing angle of the gating pulses thereby regulating the reactive output volt-ampere (VAR) product of the output current of the SVG in a closed-loop manner, as generally known. FIG. 2 shows the control circuit SGC of the static VAR generator (SVG) generating the thyristor firing pulses on lines 6. The static VAR generator proper SVG is controlled by the pulses of lines 6 so as to generate, on line 7, compensating VAR's ($\pm$VAR's) for the transmission system TLS and affecting the voltages thereof for the AC transmission lines TL.

The deviation from a steadily reference of the voltage on the transmission line TL can be considered as an "amplitude-modulation" of a sine wave signal. Modulation is well-known, in particular in the field of communications. Measuring the value of the amplitude of an "amplitude modulated" sinusoidal signal is known as amplitude demodulation. Two techniques are generally used to detect the amplitudes of transmission line voltages.

Figure 3:
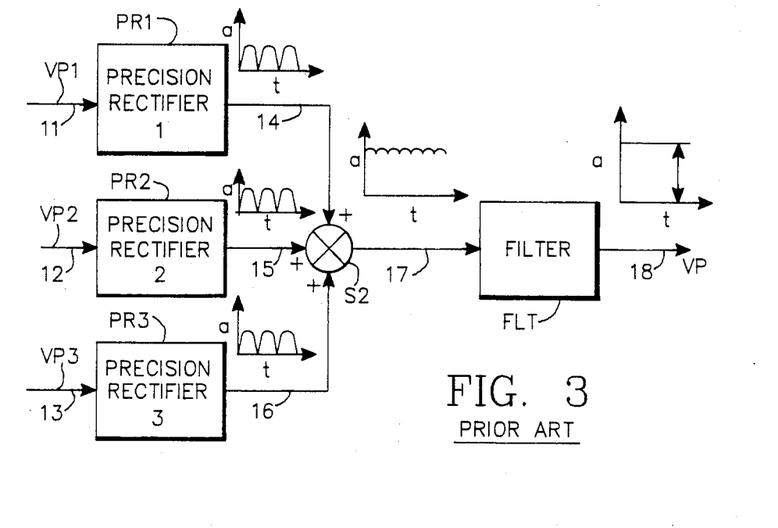
FIG. 3 is a schematic representation of a six-pulse rectifying-type amplitude detector of the prior art.

Referring to FIG. 3, amplitude demodulation is obtained by first rectifying the modulated sine wave, then reducing the remaining "rectifier ripple" with a low pass filter. The primary voltage VP1, VP2, VP3 of the transmission lines are applied by lines 11, 12, 13 to precision transformers PR1, PR2, PR3, respectively, and the rectified signals appear on the respective lines 14, 15, 16 which are summed at S2. The ripple contained by the signal of line 17 is filtered at FLT to provide on line 18 a DC signal as a function of time. This is the simplest method.

Figure 4:
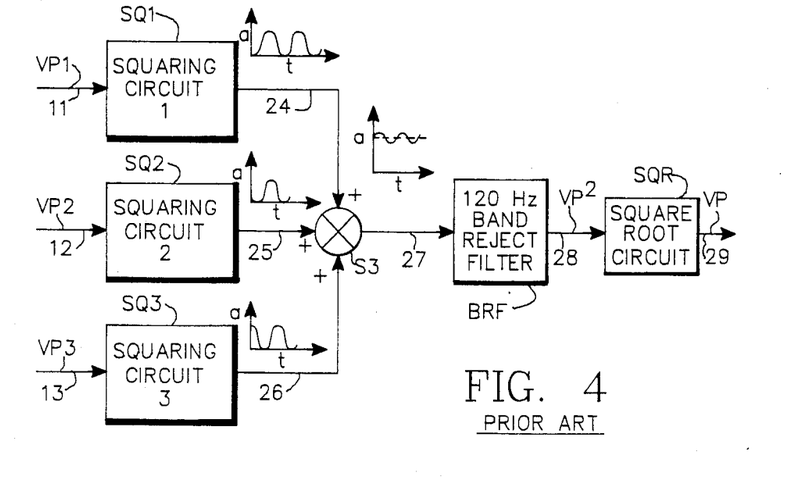
FIG. 4 is a schematic representation of a squaring-type amplitude detector of the prior art.

Referring to FIG. 4, another method consists in first squaring the modulated signal. The DC level proportional to the square of the amplitude value is filtered. The voltage amplitude is thereafter obtained by square-rooting the filtered DC signal. Accordingly, as shown in FIG. 4, the three primary voltages VP1, VP2, VP3 go to a squaring circuit (SQ1, SQ2, SQ3). The respective squared signals of lines 24, 25, 26 are summed at S3 and the resulting signal on line 27 represents $VP^2$ in case of input voltage unbalance. The signal $VP^2$ of line 28 is square rooted at SQR to provide the signal VP of line 29.

Ideally, AC electric power system voltages should be fully "symmetrical". The simplest symmetrical multiphase system to be considered here is one including three sinusoidal voltages that are equal in amplitude and equally phase shifted to one another by 120 electrical degrees. Generally, the amplitude of the voltage in a symmetrical three-phase system can be obtained faster than in a single phase system. When the three rectified voltages are summed, a significant part of the rectifier ripple cancels out in the sum. The frequency of the resulting "six-pulse" ripple is three times higher than the one with a single phase rectification, thus, it can be filtered to the same degree with less delay. Further reduction of the rectifier ripple can be achieved by first resolving the power system into six symmetrical voltages, (60 degrees part), thereby to obtain at a still higher frequency, a "twelve pulse" ripple.

A symmetrical multiphase "squaring-type" amplitude detector operates without producing any ripple and, therefore, without any delay. Each voltage is first squared and the three squared voltages are added. The second harmonics generated by squaring are themselves symmetrical and they fully cancel while the DC magnitudes are being added in the sum.

The "rectifying-type" amplitude detectors are typically used in static VAR generators at present. However, it is observed, transmission line voltages cannot be considered as symmetrical and the above stated amplitude detectors will not provide consistent performance. A significant and consistent improvement in regulation is proposed to be achieved by the amplitude detection technique according to the present invention.

One problem with the prior art techniques is that they cannot maintain the speed and accuracy claimed under symmetrical system conditions when, during transmission line operation, transmission system disturbances occur. Under system disturbances, the voltages may become grossly asymmetrical and, in addition, large values of voltage harmonics can be superimposed on the line voltages. The harmonics are partly due to iron core (transformer) saturation, phase control, and resonant poles (system resonance) in the transmission system impedance. This means that, following a disturbance, a large and relatively low frequency amplitude ripple may be generated, as explained hereinafter, which may cause an amplitude offset (error) in the prior art detection. A transient amplitude ripple may be handled by additional filtering, if one accepts increased delay in the voltage sensing and the consequent sluggish control response it causes, but detecting the wrong amplitude signal due to such offset may force the SVG to effect a wrong control action during the most critical part of its operation. For example, with a mere voltage imbalance on a simple transmission system the multiphase rectifying-type detector will generate undesired second (and other) harmonics at the output. On the other hand, a squaring detector will generate only second harmonic ripple.

In addition, in the presence of the usually most dominant second harmonic input voltage component, depending on the harmonic's relative phase to the 60 Hz (fundamental) voltage, the squaring type detector may provide either higher or lower amplitude signals than expected for the true voltage amplitude. The rectifying detector exhibits similar errors when the relative magnitudes of the superimposed input harmonics exceed certain predetermined relative values. It has also been found that a DC offset in the input voltage causes undesired low frequency (60 Hz) amplitude ripple in both types of amplitude detection. Low frequency ripple is especially harmful because it tends to make the voltage control unstable. On the other hand, filtering a low frequency ripple entails a relatively large filter delay that can significantly decrease the control response.

The prior art an Amplitude Detectors is exemplified by: L. Gyugyi and W. J. Lordeon, "Transmission System Static VAR Control", EL-2754, Research Project 750-1, December, 1982, (pp. 4–61 to 4–79), Westinghouse Electric Corp., Applied Products Divisions, 700 Braddock Avenue, 7N-N, East Pittsburgh, PA 15112.

The present invention bears on an improved transmission-line voltage amplitude detector (TLVD), one which overcomes all of the previously described shortcomings of conventional amplitude detectors when used for the regulation of electric transmission lines. The detector according to the invention is immune from voltage unbalances and it rejects all steady state voltage harmonics irrespective of the relative phases and magnitudes of the harmonics to the fundamental system voltages. No ripple or amplitude error is generated due to DC offset in the input voltage. The effect of pole voltages, generated during system resonance, is significantly reduced, including full rejection of the resonance at 120 Hz.

According to one implementation of the invention the amplitude detection is based on the use of a Fourier analyzer operating on a data base that contains a specific number of sampled data. The samples in the data base are taken during a time interval or window equal to one period of the line voltage. Sampled data within the window are updated after each period so that Fourier analysis is performed on data collected during each of such successive periods.

According to another implementation of the amplitude detector according to the invention, Fourier analysis is performed with a dynamically altered data base that constantly a specific number of sampled data. The samples in the data base are taken during a time interval equal to one period of the line voltage, but the data gathered within the time interval are updated after each sampling instant so that Fourier analysis is continuously performed on such collection of data defining a window, i.e., a sliding window. This technique is implemented both with conventional Fourier analyzers and with fast Fourier transformers (FFT's).

The Fourier analysis has been applied successfully in several fields of the technique. See, for instance, the following articles:

E. A. Udren (Westinghouse) Newark 1976, "Applied Protective Relaying", Westinghouse Electric Corp. Relay-Instrument Division, Coral Springs, FL 33060, 1979, Chapter 21 (pp. 21-1 to 21-16).

D. F. Elliott, "Fast Tranforms", Academic Press, 1982, Chapter 4 (pp. 58–98).

The following patents illustrate the application of Fourier analysis in different fields of the technique:

U.S. Pat. Nos. 4,527,101 (Zavis); 4,319,329 (Girgis); 4,275,452 (White); 4,057,756 (Ley) and British Pat. Nos. 1,350,904 and 1,407,401 (Solartron).

The technique of the sliding window involving an accumulated number of samples on a first-in and first-out adjustment, is known from U.S. Pat. Nos. 4,463,432 (Carter), 4,229,795 (Vieweg) and 4,125,895 (Buhlman).

This requires the use of a high performance microprocessor and a programming approach emphasizing high speed execution.

Figure 5:
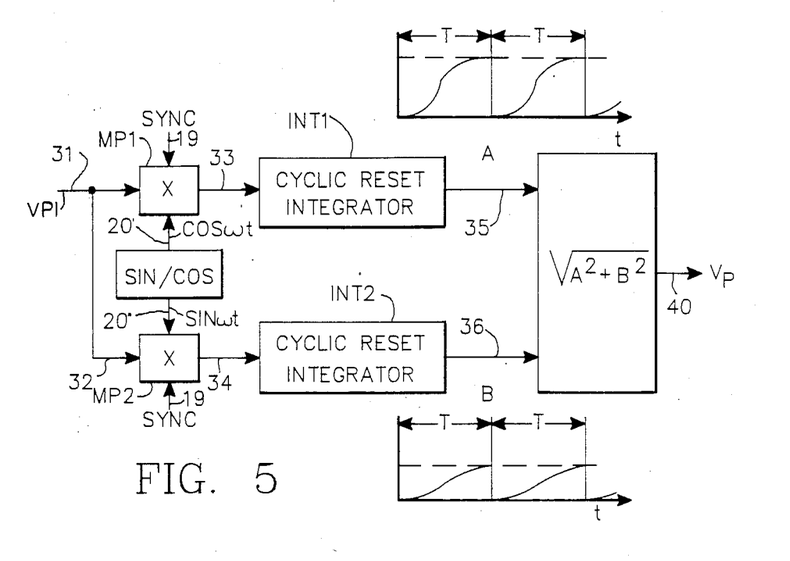
FIG. 5 illustrates in block diagram an amplitude detector using the Fourier analyzer.

FIG. 5 illustrates in block diagram the amplitude detector implemented with a Fourier analyzer in accordance with the first implementation of the invention.

Considering FIG. 5, by reference to FIGS. 3 and 4 where there are three derived primary voltages VP1, VP2, VP3 (which may be detected, singly or separately, and used individually or combined in order to derive the amplitude signal VP), on line 11 is a signal V(+) derived in relation to VP1 from the transmission line TL which, as a function of time, is equal to:

$$V(t) = VP1 \sin(\omega t + \theta) + V_{HARM} + V_{DC},$$

where VP1 is the amplitude of the fundamental voltage for phase 1, $V_{HARM}$ the harmonic and $V_{DC}$ the DC component.

The theoretical basis for the circuit of FIG. 5 will be now explained in the context of the Fourier Analysis.

The basic functional requirement of the detector is to extract the magnitude of the three phase primary line-to-line voltages. The amplitude detector must provide a ripple-free DC signal in both balanced and unbalanced primary voltage conditions. It should be immune to the presence of harmonics and transient DC offsets that may occur in the primary voltages. Considering amplitude detector AD1 for phase 1, the input voltage of line 11 is represented as:

$$V(t) = V_p \sin(\omega t + \theta) + V_{HARM} + V_{DC} \qquad (1)$$

where (as in FIG. 5):
$V_p$=Magnitude of fundamental component
$V_{HARM}$=Contribution of harmonic components
$V_{DC}$=DC component
$\omega$=Angular frequency of line voltages (Nominally $2\pi \times 60$)

The hardware implementation of a Fourier filter involves the Fourier coefficients, A and B, at frequency $\omega$, according to the relationships:

$$A = \frac{2}{T} \int_0^T V(t)\cos\omega t\, dt \qquad (2)$$

$$A = \frac{2}{T} \int_0^T V(t)\sin\omega t\, dt \qquad (3)$$

$$V_p = \sqrt{A^2 + B^2} \qquad (4)$$

Where:
$T = 2\pi/\omega$. It appears that $V_{HARM}$ and $V_{DC}$ are zero in the integrals of equations (2) and (3). Integrators INT1 and INT2 of FIG. 5 perform the above integrations.

Signal V(t) is applied by lines 11, 11' coming from phase #1 (VP1 on FIGS. 3 and 4), for instance, to multipliers MP1 and MP2. The sine and cosine functions, generated as is well known, are applied by line 20, for cos ωt to MP1, whereas by line 20' function sin ωt goes to MP2. The outputted instantaneous product appears on respective lines 33, 34 which are applied to the corresponding integrator INT1 or INT2. Equation (4) is implemented by combining signal A outputted on line 35 from INT1 and signal B outputted on line 36 from INT2 so as to square A and B and provide the square root of $A^2+B^2$. The output on line 40 is VP1. These operations are performed during the period T, the circuitry being reset for integration at the end of each period T.

The integrators INT1, INT2 under the Fourier Analyzer principle are operating cyclically with a reset at every period T. Typical waveforms are shown above blocks INT1, INT2. The basic response of this circuit is slow because it requires one full period of the line waveform in order to update the measured fundamental amplitude (VP1, VP2, VP3, thus, VP).

According to another embodiment of the invention, instead of using integrators INT1 and INT2 to perform the above summations of samples $V_j$, the technique of the "sliding window" is used. This means that rather than waiting for a whole cycle of data to accumulate before updting $V_p$, it is updated for every i. Each product, $V_i \cos(2\pi i/24)$ and $V_i \sin(2\pi i/24)$ is stored for i1 to 24. When the latest product is calculated, this value is added into the summation, while the value corresponding to the 24th sample in the past is subtracted out. Therefore, A and B always represent the summation over the latest 24 values. Having so treated with AD1, AD2 and AD3, the final step is to take the average over all three phases to determine the magnitude of the voltage.

Figure 6:
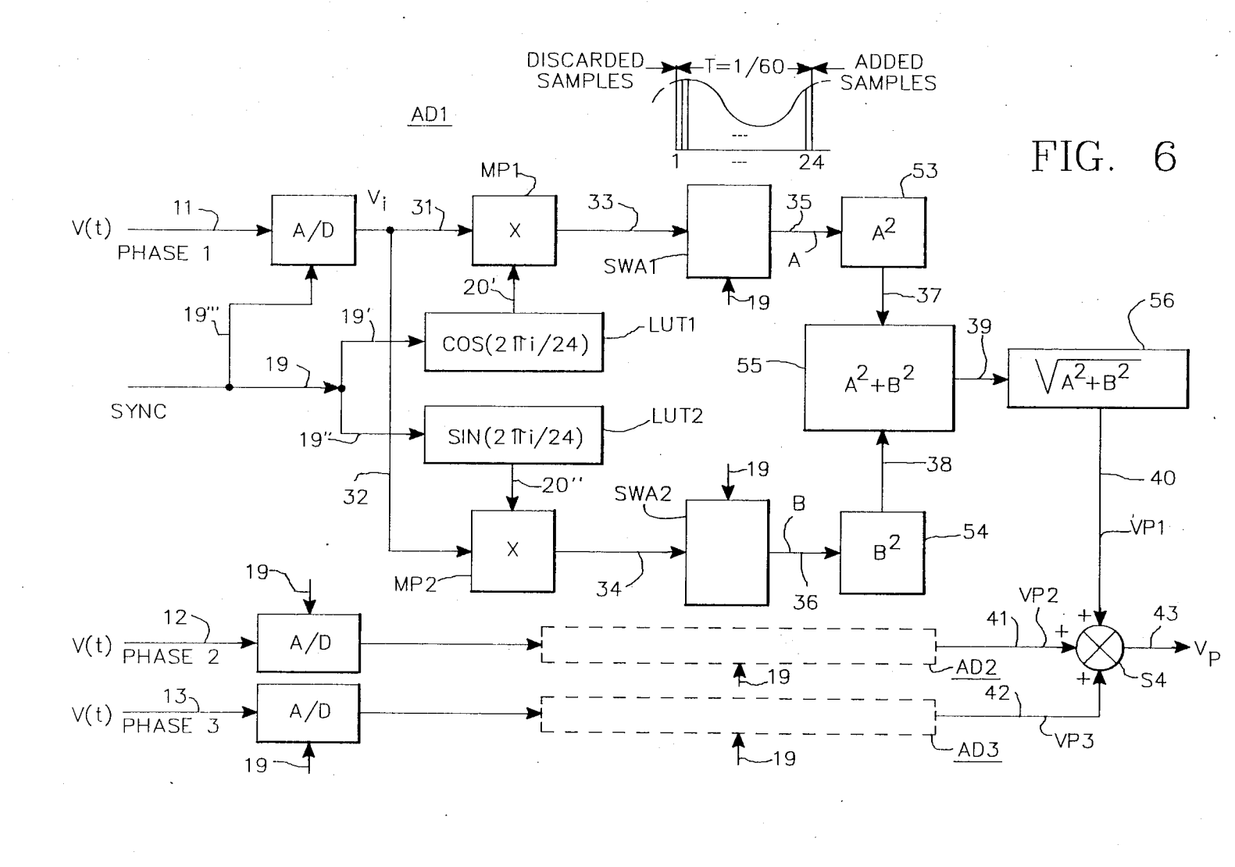
FIG. 6 illustrates the implementation of sine and cosine functions in the circuit of FIG. 5A.

As shown in FIG. 6, instead of integrators (INT1 and INT2 on FIG. 5) performing the integrations of above equations (2) and (3), integrations are now performed by sliding window analyzers SWA1, SWA2 on discrete samples of V(t), each denoted as $V_i$. The system samples V(t), typically, 24 times a cycle, so that integrations are performed in a discrete fashion as follows:

$$A = \frac{2}{T} \sum_{i=1}^{24} V_i \cos\omega t_i \Delta t \quad (5)$$

$$A = \frac{2}{T} \sum_{i=1}^{24} V_i \sin\omega t_i \Delta t \quad (6)$$

$$V_p = \sqrt{A^2 + B^2} \quad (7)$$

Where:

$$\Delta t = T/24$$

For 24 samples a cycle, the discrete values $\cos \Delta t_i$ and $\sin \Delta t_i$ are computed as $\cos(2\pi i/24)$ and $\sin(2\pi/24)$ from i=1 to 24. Also, $\Delta t$ can be forced out to result in the following simplified expressions:

$$A = \frac{1}{12} \sum_{i=1}^{24} V_i \cos(2\pi i/24) \quad (8)$$

$$B = \frac{1}{12} \sum_{i=1}^{24} V_i \sin(2\pi i/24) \quad (9)$$

Figure 5A:
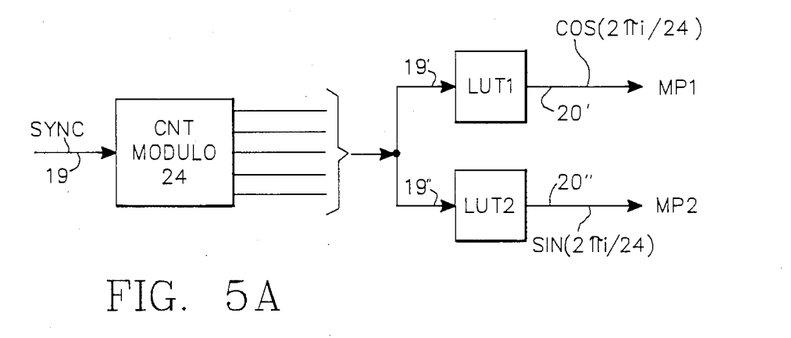
FIG. 5A shows in block diagram an amplitude detector using the sliding window technique according to the present invention.

FIG. 5A shows a counter CNT, with modulo 24, outputting in digital form five bits for the 24 successive sampling times ($2^5=32$) which serve as the address to the lookup tables LUT1, LUT2 containing, one the cosine wave data, the other the sine wave data. Accordingly, line 20' provides instantaneously a sample $\cos(2\pi i/24)$ and line 20' a sample $\sin(2\pi i/24)$.

These samples, as shown in FIG. 6, are held and summed up throughout the period T, thereby providing the integration of equation (8) by SWA1 for line 33 from multiplier MP1, and the integration of equation (9) by SWA2 for line 34 from multiplier MP2. The result is, as shown by equations (8) and (9), the coefficients A on line 35 from SWA1, and B on line 36 from SWA2. As already stated, equation (7) is implemented by squaring the signals of lines 35 and 36, then, summing $A^2$ and $B^2$ so derived, on line 39 and taking the square root. The result is VP1 on line 40.

Considering one analyzer (as SWA1, or SWA2 on FIG. 6) a series of equally spaced pulses is provided as a SYNC signal. In the example, there are 24 such pulses in the period T of the fundamental wave of for instance line 11 of FIG. 3 or 4. Line 11 carries the voltage signal $$V(t) = VP \sin(\omega t + \theta) + V_{HARM} + V_{DC}$$

An A/D converter samples under control of the SYNC pulses the amplitude of the signal of line 11, 24 times in the period and converts it each time to digital form, thus, providing a succession of samples $V_i$ on lines 31 and 32. In accordance with equations (8) and (9) the samples of lines 31 and 32 are to be multiplied (by multipliers MP1 and MP2, respectively) by a sample representing an instantaneous value of a cosine wave (derived from line 20' for multiplier MP1) and by a sample representing an instantaneous value of a sine wave (derived from line 20'' for multiplier MP2), respectively. How such samples of a cosine and a sine wave synchronized with the SYNC pulse are obtained, is illustrated by look-up tables LUT1, LUT2, respectively, on FIGS. 5A and 6.

The sliding window averagers of FIG. 6 (SWA1, SWA2) are like in the aforestated U.S. Pat. Nos. 4,463,432; 4,229,795 and 4,125,895. For the purpose of the disclosure, these three U.S. patents are hereby incorporated by reference. SWA1 and SWA2 represent the sliding window avergers which are used as disclosed in the incorporated by reference patents (SWA1 between input line 33 and output line 35, SWA2 between input line 34 and output line 36). Accordingly, N samples are instantaneously summed up with the first incoming sample in and the last sample outgoing. As a result, the speed of fundamental amplitude (VP) detection is significantly increased.

Each sliding window averager SWA1, SWA2 controlled by the SYNC signal of line 19 operates in the following manner: First, the values of N consecutive samples are added in order to initiate the sliding window. It is observed that the sum of N samples (divided by N) is proportinal to the integral of the input signal during the preceding full line voltage period T. The integration of the input signal will become continuous within the resolution of one sampling interval when, after initialization, each new sample replaces the oldest sample within the N-sample winndow. In other words, whenever a new sample is added, the oldest sample is subtracted from the initialized sum of samples. The averger thus provides the latest one cycle integral of its input updated within a small predetermined delay of maximum one sampling period. It should also be noted that the average line response of the averager is essentially independent of N and is equal to one half of one period (T2=8.33 ms). This figure is important for achieving fast and consistent voltage control with the transmission line voltage detector under small (linear) voltage disturbances on the transmission line.

The selection of the number of samples, N, is related to the required harmonic immunity of the amplitude detection. Theoretically, it need not be larger than twice the order of harmonic to be rejected plus 2 samples. Preferably, though, N is selected to be a multiple of the pulse number in the power circuit of the SVG. For example, for a six-pulse power system, N should be equal to 6, 12, or 24, etc. Such selection synchronizes the ripple in the control with respect to the SVG's power circuit. This, in turn, minimizes the telephone interference (IT factor) injected by the SVG equipment via the transmission line. The essentially ripple-free voltage detector provides optimal, equidistat firing of the thyristors in the thyristor controlled reactors (TCR's).

Since the detector requires a large amount of accurate computations and storage (memory) functions, it is well suited for implementation by digital techniques, such as microprocessors. The multiplication of the input signal V(t) by the sine/cosine functions need not be continuous. The product needs be effected only at the instant of sampling by the averager (SWA1, SWA2). The period of the analyzing (sine/cosine) functions must be identical to that of the line frequency as required by the Fourier analysis, but only N amplitude values need to be available, at which time the average is sampling. The resulting discrete output samples, "A and B of lines 35 and 36"; in FIG. 6 are further processed by the square-root of the sm of squares function (at 55), also N times a cycle. The output, VP1 on line 40, is an essentially ripple-free DC signal proportional to the amplitude of the fundamental line voltage. It can be used for balancing an otherwise unbalanced system, or it can be added at S4 to the other amplitudes similarly derived in order to regulate the average transmission system voltage.

The simplicity of the above described algorithm consisting in, at each sampling instant, adding to the sum of N samples the newest sample value and subtracting the oldest, favor the implementation by a microprocessor, due to the short execution time of the two add/subtract operations. However, there is the danger that the existing sum of samples becomes altered at a given moment due to the unintentional addition of spurious data, such as may occur if there is noise, or an intermittent malfunction. In such a case, the simple algorithm proposed is unable to "purge" the sum of samples from the spurious data, resulting in a condition in which the sum of samples retain an erroneous value indefinitely. In high reliability systems, provision is made to periodically recaculate the sum of the last N stored samples. Such an operation, which can be done at selected instants chosen to be compatible with the minimization of microprocessor execution time requirements, will ensure that any accumulated error in the sum of samples is periodically cleared. Assuming illustratively three pairs of sliding windows like in FIG. 6, each sliding window is cleared or purged, alernatively so that in six cycles they all have been purged in its turn.

Another implementation of the invention consists in the combination of the dynamically altered data base with fast Fourier analysis. The operation is as follows: First, it is noted that the fast Fourier analysis is one of several mathematical techniques to perform Fourier analysis. It is based on the "fast Fourier transform" (FET) that is especially suitable for implementaton with digital computers since it requires only additions and multiplications to determine the amplitudes in the spectrum of an input signal. See for instance: British Patent Nos. 1,350,904 and 1,407,401 and U.S. Pat. No. 4,057,756, which are hereby incorporated by reference.

The FET performs the analysis on a given number of input data samples, usually (but not necessarily) arranged as blocks of binary multipliers (N=8, 16, 32, 64, ... etc.).

Figures 7, 7A:
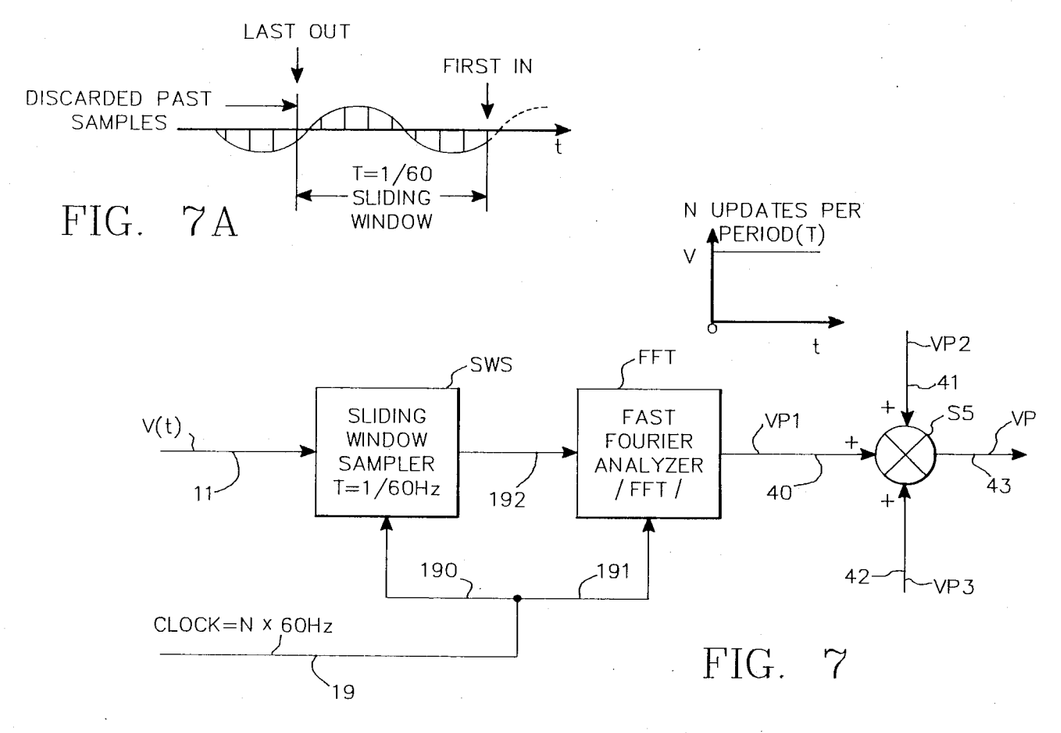
FIG. 7 illustrates in block diagram the use of the sliding window technique with the Fast Fourier transform method.
FIG. 7A is a curve showing the first-in and last-out sampling method in the data collection of FIG. 6.

Referring to FIG. 7, the input data samples for the FET are contained in a sliding window sampler SWS (corresponding to SWA1, SWA2 of FIG. 6). First, sampler SWS must be initialized by collecting N samples evenly spaced in time. Once the N samples have been collected, the FET is clocked (enabled) to perform the first analysis. The result at the output of the FET is the amplitude of the fundamental input signal VP1. VP1 is held at the FET output until a new, updated data base becomes available following the consecutive data sampling and a repeated FET operation. After initialization, the input data base in the time window is slid repeatedly by inserting the latest input voltage sample and discarding the oldest one, like in the previous example of sliding data base implementation for conventional Fourier analysis. FIG. 7A shows with a curve the first-IN, last-OUT method of "sliding" the T=1/60 window in synchronization with the sampling operation.

The individual voltage amplitude VP1, derived according to the invention, can be used for unbalanced individual phase voltage control. The sum of individual amplitudes can be used for average (balanced) voltage control of the transmission line. Alternately, if the input voltage V(t), represents the positive sequence component of the transmission system, VP1 alone can be used for balanced voltage control. (There is no significant difference between the positive sequence and average amplitudes for typically less than 5% transmission system unbalance.

The Voltage Amplitude Detector consists of the following standard boards:
1. iSBC 86/05 Single Board Computer-It contains a 8086-2 CPU, which performs all required digital calculations. The manufacter is: Intel.
2. RTI 732 Analog Input/Output System-It contains eight Differential input channels and a 12-bit A/D converter, plus two independent D/A converters. The manufacturer is: Analog Devices.
3. iSBX 328 Analog Output Module-Contains eight digital input channels and a 12-bit D/A converter. This card is mounted in a piggy-back fashion on the iSBC 86/05 in one of the two iSBX bus connectors. The manufacturer is: Intel.

These boards have jumper-selectable options so that they can be user-configured.

The A/D converter on the 732 board digitizes all the analog inputs to the system. The board is configured so as to accept differential analog input signals in the ±10 volt range. Channels 0 to 2 (Pins 3 to 14) are connected to the three phase voltages, VP12, VP23, VP31, for voltage amplitude detector function. The signals are transmitted differentially, wit the "/S" suffix referring to the signal line and "/R" referring to the return line. "/SH" refers to a line where a shield can be connected, if used. Channel 3 is connected to the current signal IP. Channel 4 is connected to the +5 supply line, which is used as a reference voltage by which the integrity of the A/D is tested.

Two 12-bit D/A channels on the 732 (DAC0 and DAC1, respectively) are used to output the analog signal representing the calculated voltage amplitude. The voltage amplitude is calculated to a 15-bit value DAC0 outputs as 0 to 10 volt signal based on the upper 12 bits.

The 86/05 board reads the converted results from the 732 board via the Multibus. This is the only data transfer over the Multibus in this system. The 86/05 is the only bus master in the system, and the slot where it resides must have the Multibus signal Bus Priority In (BPRN/) grounded.

The 86/05 board receives all other digital I/O upon input ports A and B through connector J1. All input signals are connected to Port B. The SMP signal is a timing signal that is sampled to determine when to start the execution of the algorithm. Port A is used for output signals. ACK is the acknowledge signal that is used to indicate the period when the processor is waiting for the next processing period (an therefore polling SMP).

The board is configured to use two 4K×8 EPROM's. 2732A-2 devices with 200 ns access times are recommended, since the board in this application is configured for an access time of 216 ns. (250 ns 7232A's would be too slow).

It is understood that amplitude detection with the amplitude detector according to the invention is applicable not only for the detection of voltage, but also for the detection of current.

We claim:

1. A controlled static VAR generator including static power switches controlled for coupling a reactive power source onto AC transmission lines for power factor compensation thereof and detection means responsive to the AC transmission line voltage for providing a control signal representative of the amplitude of said line voltage, said control signal being applied to said static power switches; said detection means comprising:

means responsive to the AC transmission line voltage for deriving a time related signal V(t) representative thereof and of fundamental frequency $\omega = 2\pi f$;

means synchronized with said AC transmission line voltage for providing a first signal representative of $\cos(\omega t)$ and a second signal representative of $\sin(\omega t)$;

first multiplier means for providing with said time related signal V(t) and said $\cos(\omega t)$ representative signal a signal representative of a first product $V(t) \times \cos(\omega t)$;

second multiplier means for providing with said time related signal V(t) and said $\sin(\omega t)$ representative signal a signal representative of a second product $V(t) \times \sin(\omega t)$;

first means for integrating through the fundamental period T said first product representative signal to derive the Fourier coefficient $$A = \frac{2}{T} \int_0^T V(t) \cdot \cos(\omega t) dt;$$

second means for integrating through the fundamental period T said second product representative signal to derive the Fourier coefficient $$B = \frac{2}{T} \int_0^T V(t) \cdot \sin(\omega t) dt;$$

means responsive to said first and second integrating means for deriving said control signal as a voltage amplitude representative signal V by calculating $$V = \sqrt{A^2 + B^2}.$$

2. The generator of claim 1 with said time related signal V(t) deriving means and said synchronized means each including means for sampling the inputted signal for deriving an output sample, said first and second multiplier means being operative on said output samples to generate samples of said first and second products; said first and second integrating means being operative on N samples of said first and second multiplier means respectively, within the period T to provide said Fourier coefficients as an average thereof.

3. The generator of claim 2 with upon each new sample into said first and second integrating means, respectively, said average is effected on N samples within the window T, on a first IN and last OUT basis.

4. The generator of claim 2 with said first and second integrating means, each including Fast Fourier Transformer means.

5. The generator according to claim 1 with said AC transmission lines being a three-phase AC transmission line system;

said detection means being responsive to said AC line system for deriving three respective transmission line phase voltage representative signals, $V_1$, $V_2$, $V_3$ as said V(t) signal;

first, second and third combinations of said V(t) signal deriving means, of said synchronized means, of said first and second multiplier means, and of said first and second integrating means responsive to said phase voltage representative signals, respectively for computing Fourier coefficients $$A = \frac{2}{T} \int_0^T V(t) \cdot \cos(\omega t) dt;$$

and $$B = \frac{2}{T} \int_0^T V(t) \cdot \sin(\omega t) dt;$$

where $T = 2\pi/\omega$ the period of the fundamental in said transmission lines;

fourth, fifth and sixth means for said three phases, respectively, responsive to a corresponding one of said first, second and third combinations for calculating amplitude voltages $V_1$, $V_2$, $V_3$ for the respective phases in accordance with the formula $$V = \sqrt{A^2 + B^2};$$

and said deriving means combining $V_1 + V_2 + V_3$ to derive said control signal representative of an error in the amplitude voltage on said transmission lines.

6. The system of claim 5 with said first, second and third means being sliding window integrators.

7. The system of claim 6 with each of said first, second and third means involving a pair of sliding window integrators affected to said A and B Fourier coefficient, respectively; means being provided for resetting said sliding window integrator periodically after a multiple number of T periods.

8. The system of claim 7 with said resetting means being operative cyclically and permutatively on six said sliding window integrators, thereby to eliminate any accumulated error.

9. The system of claim 5 with said control signal being used to balance out said transmission lines.

10. The system of claim 5 with said control signal being used to eliminate a disturbance in said transmission lines.

11. The system of claim 6 with said sliding window integrators being sampled at frequency which is a multiple of the transmission line frequency.

12. An amplitude detector system for deriving a signal representative of themagnitude of one electrical quantity E(t) as a function of time, as a characteristic of an AC transmission line comprising:
  means responsive to the AC transmission line for deriving a time related signal E(t) representative thereof and of fundamental frequency $\omega = 2\pi f$;
  means synchronized with said AC transmission line quantity for providing a first signal representative of cos ($\omega$t) and a second signal representative of sin ($\omega$t);
  first multiplier means for providing with said time related signal E(t) and said cos ($\omega$t) representative signal a signal representative of a first product E(t)×cos ($\omega$t);
  second multiplier means for providing with said time related signal E(t) and said sin ($\omega$t) representative signal a signal representative of a second product E(t)×sin ($\omega$t);
  first means for integrating through the fundamental period T said first product representative signal to derive the Fourier coefficient $$A = \frac{2}{T} \int_O^T E(t) \cdot \cos(\omega t) dt;$$

second means for integrating through the fundamental period T said second product representative signal to derive the Fourier coefficient $$B = \frac{2}{T} \int_O^T E(t) \cdot \sin(\omega t) dt;$$

and
  means responsive to said first and second integrating means for deriving said magnitude representative signal E(t) by calculating $$E(t) = \sqrt{A^2 + B^2} .$$

13. The detector of claim 12 with said time related signal E(t) deriving means and said synchronized means each including means for sampling the inputted signal for deriving an output sample, said first and second multiplier means being operative on said output samples to generate samples of said first and second products;
  said first and second integrating means being operative on N samples of said first and second multiplier means respectively, within the period T to provide said Fourier coefficient as an average thereof.

14. The detector of claim 13 with upon each new sample into said first and second integrating means, respectively, said average is effected on N samples within the window T, on a first IN and last OUT basis.

15. The detector of claim 13 with said first and second integrating means, each including Fast Fourier Transformer means.

16. The detector of claim 12 with said electrical quantity being the voltage of the transmission line.

17. The detector of claim 12 with said electrical quantity being the current of the transmission line.

* * * * *